March 10, 1942.    J. C. FLUGGER    2,276,177
COMBINATION SHUTTER, BLIND, AND VENTILATING DEVICE
Filed April 18, 1939    2 Sheets-Sheet 2
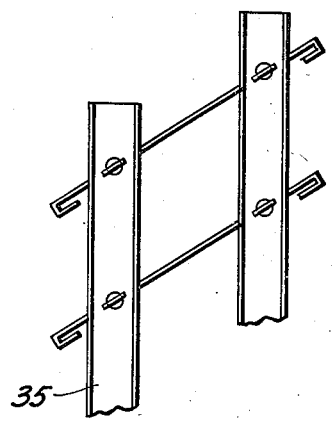
Fig. 6
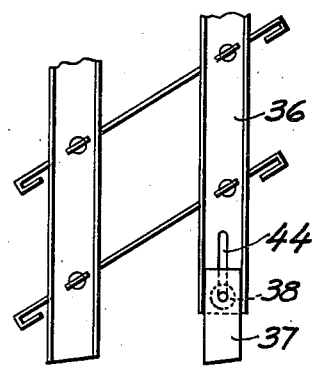
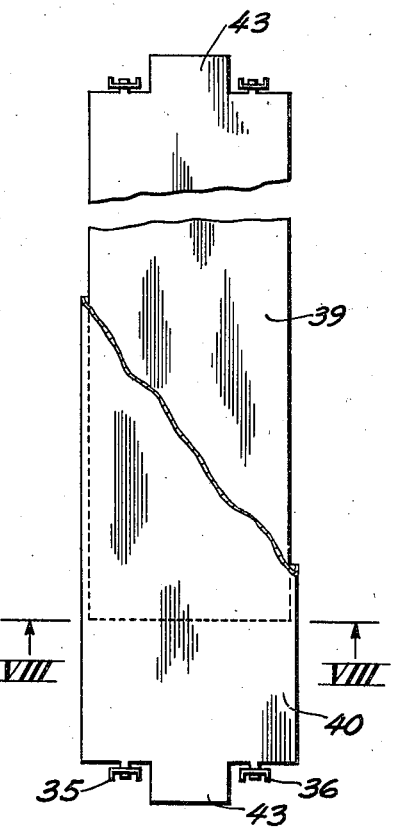
Fig. 7
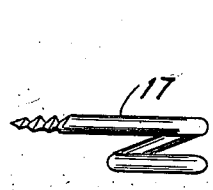
Fig. 9
Fig. 8
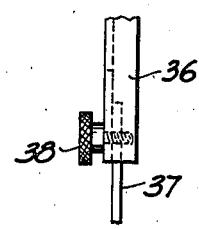
Fig. 10
INVENTOR
John Cyril Flugger
BY
ATTORNEY Patented Mar. 10, 1942

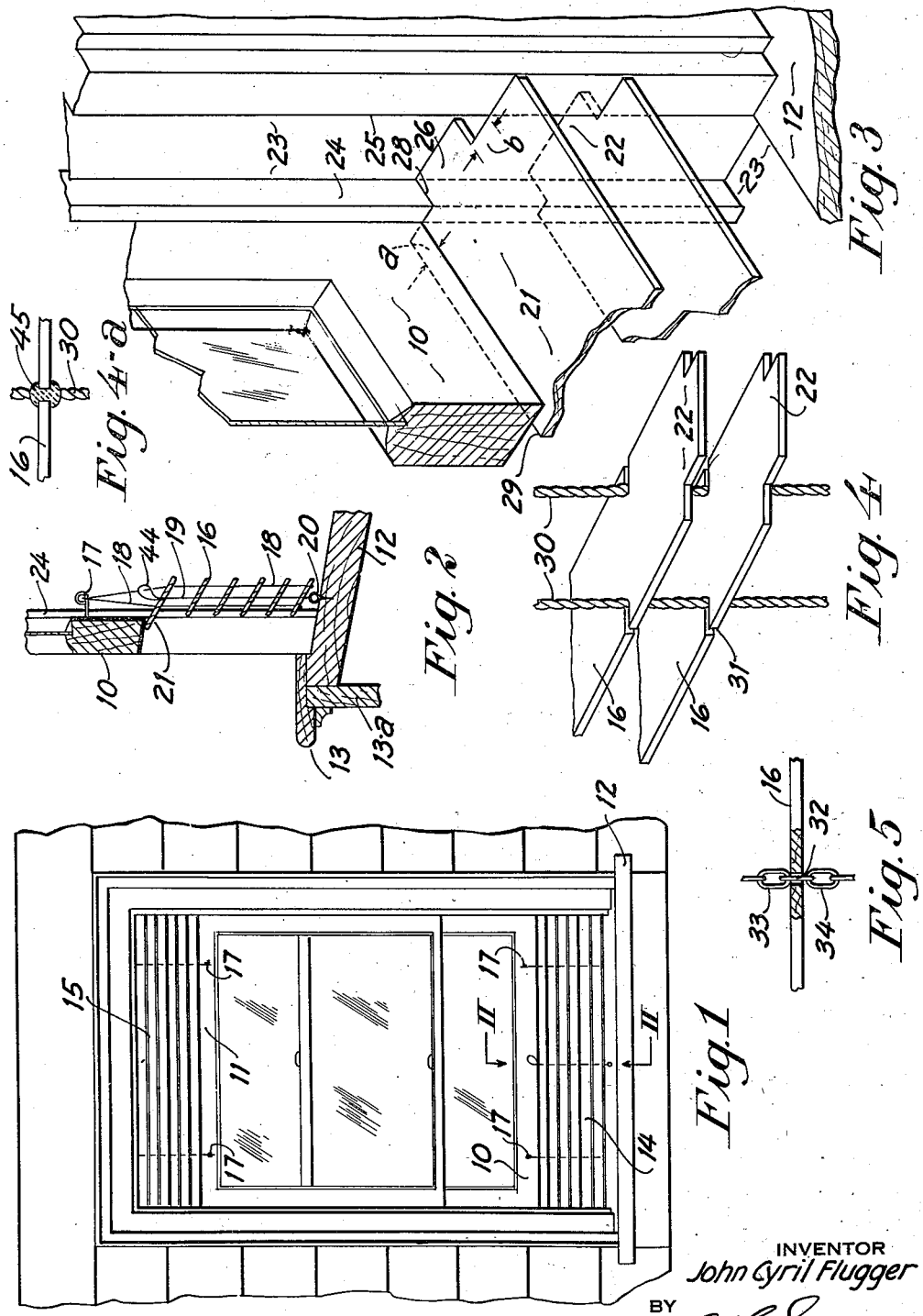

2,276,177

UNITED STATES PATENT OFFICE 2,276,177

COMBINATION SHUTTER, BLIND, AND VENTILATING DEVICE

John Cyril Flugger, San Francisco, Calif.

Application April 18, 1939, Serial No. 268,494

9 Claims. (Cl. 98—99)

This invention relates to a new and useful combination shutter blind and ventilating device. More particularly, the invention involves a device which may be readily mounted in an ordinary window structure without modification. The device serves to improve ventilation, protect the interior of a room from inclement weather, and serves as a blind simultaneously admitting fresh air without exposing the occupants of the room to the view of neighbors.

An object of the invention comprises the provision of a combination shutter blind and ventilator which is economical to manufacture, simple to install, and efficient in operation.

Another object of my invention is to provide a shutter which is not only easy to install in a window but also easily removed therefrom, and which automatically collapses into a position substantially out of sight when the window is closed.

I have illustrated my invention by showing two species thereof in the drawings, in which:

Figure 1 is a general assembly illustrating a double-hung window with my shutter device installed on both the top and bottom sash.

Figure 2 is a section at II—II of Figure 1 showing my device in open or extended position and illustrating the manner in which it is supported.

Figure 3 is a detailed isometric view with parts broken away to reveal the manner in which my device is mounted in the pulley stile of the window and slidably engages the same.

Figure 4 is a detail showing at an intermediate assembly stage one means for supporting and spacing the shutter bars or slats in parallel relationship.

Figure 4a illustrates the supporting means of Figure 4 secured to a shutter bar by a suitable plastic material.

Figure 5 is a detail of an alternative flexible supporting means for the shutter bars.

Figure 6 is an end view of a second species of the invention.

Figure 7 is a plan view showing the telescoping sections of a shutter bar of Figure 6.

Figure 8 is a section on line VIII—VIII of Figure 7 revealing the transverse sectional shape of the telescoping bar or slat of Figure 7.

Figure 9 is a detail of a fastening means for securing my device to the window sash.

Figure 10 is a detail of the adjustable supporting means also shown in Figure 6.

From the drawings, it will be apparent that the double-hung window of Figure 1 is of conventional structure and comprises a lower sash with a bottom rail 10 and an upper sash with a top rail 11. The lower sash is partially raised in Figure 1 and shutter 14 is in extended position. The upper sash is partially lowered and shutter 15, secured to the top of the window casing and to top rail 11, is also in extended position.

In Figure 2, stool 13 and apron 13a are of course on the room side of the window. Shutter 14 is supported on the outside of the window and operates in the pulley stile for the upper sash. The shutter comprises a series of spaced flat bars or slats 16, which may be of wood or metal, suspended from the outside face of bottom rail 10 by means of an eye screw 17 and flexible supporting means 18. The flexible supporting means serves to maintain the shutter bars in a parallel spaced relation and the outside pulley stile to secure the bars in vertical alignment. Flexible restraining means 19 is normally secured at its lower end to eye screw 20 in sill 12, and not only limits the upper extremity of the shutter but serves the additional two-fold purpose of dampening transverse vertical vibrations of the shutter bars and providing means for supporting the shutter in collapsed position when the window is raised, as will be more fully explained hereinafter.

Screw eyes 17 and 20 are of the helical type (see Figure 9) and permit ready insertion and removal of the flexible supporting and restraining means 18 and 19 respectively. Where the flexible supporting means is a cord or rope as in Figure 4, it is preferred to pass the cord two or more times through screw eyes 17 so that the angle of the shutter bars may be adjusted by slipping the cord through the screw eyes but will be maintained at any desired angle by the frictional grasp of cord 18 on the screw eyes when the window is raised to the upper limiting position and the cord is thereby tightened.

During inclement weather, rain which strikes the outside of the lower window sash drains down the window and would drop from bottom rail 10 inside the shutter and possibly be carried by air currents inside the room and thereby result in damage to furniture, rugs or the like. Top shutter bar 21 is constructed and arranged to prevent such damage and is positioned so that it will project under the outside edge of bottom rail 10, catch water which drains from the window, and deflect it outwardly over the outside edges of the lower shutter bars to sill 12.

Figure 3 shows the manner in which positioning means on the shutter bars and the pulley stile cooperate to hold the bars in vertical alignment and substantially prevent transverse oscillation of the shutter in the wind. The positioning means on the shutter slidably engages the pulley stile and may comprise projecting portions which may be separate elements attached to the bars or integral lugs 22 extending from the end of the shutter and adapted to fit in the channel formed by pulley stile 23.

The width of lugs 22 should be substantially equal to, but sufficiently less than, the width of the pulley stile to permit vertical movement of the shutter bar but secure the same against transverse oscillation. In other words, the distance between parting bead 24 and casing member 25 should be only slightly greater than the width of lugs 22.

The positioning means 26 on top shutter bar 21 is modified in order to permit the top slat to assume a position such that its inner edge is under the lower side of bottom rail 10, as shown in Figures 2 and 3. This positioning means comprises a lug 26 having an edge 28 which engages parting bead 24. The distance from edge 28 to the room side 29 of slat 21 should exceed the width of the parting bead by a substantial amount (equal to distance $a$ in Figure 3). Also the width of lug 26 should be less than the width of pulley stile 23 by an amount sufficient to permit movement of slat 21 transversely and out from under bottom rail 10 when the window is lowered and the shutter collapsed. In other words, distance $b$ in Figure 3 should be slightly greater than $a$.

A method of assembling and supporting the series of shutter bars or slats will be apparent from Figures 4 and 4a. Each shutter bar 16 is provided with slots 31. The flexible supporting means, such as cords or ropes 30 fits snugly in these slots. The cords or ropes 30, after insertion in the slots, are fixed or sealed therein by a suitable plastic material as illustrated in Figure 4a. Such a sealing material is preferably resilient and may be applied as a waterproof cement or plastic 45 such as rubber cement. Where the shutter bars are to be painted after assembly a chlorinated butadiene polymer, such as "Neoprene" or "Chloroprene," may be utilized. Such a resilient plastic is resistant to deterioration by oils in the paint and will yield and not crack or break as the ropes or cords are bent when the shutter is collapsed.

The second type of supporting means shown in Figure 5 comprises a chain of suitable corrosion-resistant material, such as brass or bronze, having links which fit in the slots of the shutter bars. The links 32 of the chains fitting in the shutter bar slots are preferably of a length just sufficiently greater than the width of slats 16 to permit engaging links 33 and 34 to bear against the faces of the shutter bar and secure it against undue vertical movement. It will be observed that links 33 and 34 are substantially at right angles to link 32 and therefore prevent the shutter bar from sliding along the chain. A suitable means is provided (not shown) for holding link 32 in the slot, and may comprise a plastic sealing means as in Figure 4a.

A brief description of the operation of the device of Figures 1 to 5 may serve to clarify this disclosure. When the lower window sash is closed, bottom rail 10 will move downwardly and the shutter will collapse shutter bars 16 approaching each other and the flexible supporting means 18 will fold in between said slats. Top shutter bar 21 will move transversely and outwardly until it clears the outside edge of bottom rail 10. As the window is completely closed, the lower shutter will rest in collapsed position on sill 12 and will remain there until the window is again opened when the position shown in Figure 2 will be assumed. If it is desired to open the window further or to have the shutter out of the way when the window is open, then flexible restraining means 19 will be released at its bottom end at screw eye 20 and loop 44 placed over one of screw eyes 17. Since restraining means 19 is secured firmly to the bottom slat of the shutter and passes through holes in the remaining slats without being secured thereto, the bottom slat will be pulled upward and lift the remaining slats with it to hold the shutter in collapsed position alongside bottom rail 10 and adjacent to supporting screws 17. When the shutter is in this position it does not interfere with motion of the window either to its extreme upper or lower position.

Shutter 15 on the upper sash collapses in the same manner as the lower shutter. When the top rail of the upper sash moves upwardly toward closed position, screw eyes 17 engage the lower slat member and lift it, together with the remaining slats, into a collapsed and inconspicuous position.

The second species of the invention shown in Figures 6 to 8 comprises a series of metallic shutter bars pivotally mounted on metallic supporting members 35 and 36. On the lower end of supporting member 36 there is provided means for adjusting the tilt of the shutter comprising member 37 slidably engaging supporting member 36 having set screw 38 passing through slot 44 in member 36 and adapted to secure member 37 in any desired position. The bottom ends of members 35 and 37 may be cut at an angle corresponding to the angle of the window sill.

The shutter bars comprise sections 39 and 40 telescoping one in the other, as shown by the cross-section in Figure 8. The edges of telescopic section 40 are bent back in the shape of a U as shown at 41 and, in addition to forming a channel in which telescopic member 39 may longitudinally slide, also serve to reinforce and strengthen slat member 40. Telescopic section 39 is provided with a downwardly projecting bead 42 which reinforces and strengthens this member against lateral deflection. Each of the telescopic sections is provided with means 43, similar to lugs 22 in Figure 3, for cooperating with the pulley stile and maintaining the device in position in the window.

In operation the shutter bars are set at any desired angle by adjusting member 37 to the desired position. The device is positioned in the window by first telescoping slat member 39 in 40 and then extending the telescopic sections until positioning means 43 extends into and fits securely in the channel formed by the outside pulley stile of the window.

The utility and advantages of my device are quite apparent. The species shown in Figures 1 to 5 may be manufactured as a series of standard sizes adapted to fit standard windows. The second species is adjustable within limits to any size window and may be installed by merely placing the device in position.

My device serves as a shutter and blind in that when the window is in open position it protects the opening between the sash rails and the window sill or casing to the extent that rain, snow or sleet will not be blown inside the room. Also the amount of light which enters may be controlled by adjusting the angle of the shutter bars. Further, the shutter bars may be adjusted so as to direct air currents either toward the ceiling or the floor, as desired. In addition, it may be noted that when the shutter bars are made of sound-absorbing or reflecting material, extraneous sounds from the outside are absorbed or reflected and thereby excluded, at least to some degree. My device is particularly useful in bedrooms where one wishes to obtain adequate ventilation even in inclement weather without being exposed to the view of neighbors and without permitting damage to floors, rugs or furniture from rain or the like.

I have described my invention in detail and given specific examples of preferred embodiments thereof. It is to be understood that my invention is not limited to the specific features herein disclosed but is of the scope of the claims appended hereto and embraces alternatives and equivalents which would be apparent to one skilled in the art.

I claim:

1. A combination shutter, blind and ventilating device comprising a plurality of shutter bars, open-ended slots in the opposite edges of said bars, said shutter bars being disposed one above the other and said series of slots being substantially in vertical alignment, flexible supporting means fitting in said slots and adapted to position said shutter bars in spaced apart parallel relationship with unobstructed ventilating spaces therebetween, and means for securing said bars to said flexible supporting means.

2. A device as defined in claim 1, further characterized in that said securing means comprises an oil-proof elastic plastic material adapted to resist deterioration or softening in the presence of oil.

3. A device as defined in claim 1, further characterized in that said securing means comprises a polymerized chlorinated butadiene plastic.

4. A device as defined in claim 1, further characterized in that said flexible supporting means comprises a cord and said securing means comprises an oil-proof elastic plastic material adapted to resist deterioration or softening in the presence of oil.

5. In combination with a double-hung window comprising upper and lower vertically movable sashes and vertically disposed pulley stiles for each of said sashes, a plurality of slats, flexible means secured to each of said slats on opposite sides of the longitudinal axis thereof and for supporting said slats in spaced relationship to form substantially unobstructed ventilating spaces therebetween, supporting means mounted on the lower window sash and positioning said slats in alignment with the pulley stiles of the upper one of said sashes, whereby when said lower window is opened said flexible means is automatically extended to support said slats in spaced relationship and when said lower window is closed said flexible means and slats are automatically collapsed, said flexible means adjustably engaging said supporting means for altering the angle of the transverse axis of said slats relative to the plane of said window and independently of the spaced relationship of the slats, and means on each end of a plurality of said slats adapted to fit in said last-mentioned pulley stiles to thereby secure the longitudinal axes of said slats substantially parallel to the plane of said window sashes.

6. In combination with a double-hung window comprising upper and lower vertically movable sashes and vertically disposed pulley stiles for each of said sashes, a plurality of slats, flexible means secured to each of said slats on opposite sides of the longitudinal axis thereof and for supporting said slats in spaced relationship to form substantially unobstructed ventilating spaces therebetween, supporting means mounted on the lower window sash and positioning said slats in alignment with the pulley stiles of the upper one of said sashes, whereby when said lower window is opened said flexible means is automatically extended to support said slats in spaced relationship and when said lower window is closed said flexible means and slats are automatically collapsed, said flexible means adjustably engaging said supporting means for altering the angle of the transverse axis of said slats relative to the plane of said window and independently of the spaced relationship of the slats, means on each end of a plurality of said slats adapted to fit in said last-mentioned pulley stiles to thereby secure the longitudinal axes of said slats substantially parallel to the plane of said window sashes, and means to engage the bottom rail of the lower window sash when in partially raised position to divert water draining down said window to the outside edge of said slats.

7. In combination with a double-hung window comprising upper and lower vertically movable sashes and vertically disposed pulley stiles for each of said sashes, a plurality of slats comprising a top slat and a series of lower slats, flexible means secured to each of said slats on opposite sides of the longitudinal axis thereof and for supporting said slats in spaced relationship to form substantially unobstructed ventilating spaces therebetween, supporting means mounted on the lower window sash for suspending said flexible means and positioning said slats in alignment with the pulley stile for said upper window sash, whereby when said lower window is opened said flexible means is automatically extended to support said slats in spaced relationship and when said lower window is closed said flexible means and slats are automatically collapsed, said flexible means adjustably engaging said supporting means for altering the angle of the transverse axis of said slats relative to the plane of said window and independently of the spaced relationship of the slats, said flexible means being constructed and arranged to position said top slat substantially in horizontal alignment with the bottom edge of the bottom rail of said lower window sash, and means cooperating with a pulley stile of said window to position the inner edge of the top slat under the outer edge of said bottom rail, whereby water which drains down said window will be diverted outwardly over said slat.

8. A combination shutter, blind and ventilating device comprising a plurality of shutter bars, open-ended slots in the opposite edges of said bars, said shutter bars being disposed one above the other and said series of slots being substantially in vertical alignment, flexible supporting means comprising a chain having links secured in said slots against substantial vertical movement therethrough.

9. A device of the class described comprising a plurality of shutter bars, open-ended slots in opposite edges of said bars, said shutter bars being disposed one above the other and said series of slots being substantially in vertical alignment, flexible supporting means comprising chain links fitting in said slots, said chain links having an inside dimension along the vertical axis thereof not substantially greater than a value equal to the thickness of the slat at the edges of the slot plus the thickness of the ends of each link which engages and interlocks with said first-mentioned links, whereby said engaging links secure said slats against undue vertical movement along said chain.

JOHN CYRIL FLUGGER.